(12) United States Patent
Rodis

(10) Patent No.: US 6,979,403 B2
(45) Date of Patent: Dec. 27, 2005

(54) GREASE INTERCEPTOR (TRAP) AND SERVICING METHOD

(76) Inventor: Nancy Jeannine Rodis, 2803 Green Shade Ct., Ellicott City, MD (US) 21042

( * ) Notice: Subject to any disclaimer, the term of this patent is extended or adjusted under 35 U.S.C. 154(b) by 92 days.

(21) Appl. No.: 10/639,479

(22) Filed: Aug. 13, 2003

(65) Prior Publication Data

US 2005/0029201 A1  Feb. 10, 2005

Related U.S. Application Data

(60) Provisional application No. 60/406,516, filed on Aug. 28, 2002.

(51) Int. Cl.[7] .............................................. C02F 1/40
(52) U.S. Cl. ...................................... 210/232; 210/521
(58) Field of Search ............................... 210/744, 800, 210/104, 232, 244, 513, 521, DIG. 5

(56) References Cited

U.S. PATENT DOCUMENTS

| | | | |
|---|---|---|---|
| 1,672,583 A | | 6/1928 | Travers |
| 1,695,781 A | * | 12/1928 | Otis .......................... 210/539 |
| 2,747,736 A | | 5/1956 | Mobley |
| 2,879,895 A | | 3/1959 | Mclain |
| 3,463,172 A | | 8/1969 | Naylor |
| RE27,346 E | | 4/1972 | Naylor |
| 3,662,918 A | * | 5/1972 | Crawford et al. ......... 210/532.2 |
| 3,665,645 A | * | 5/1972 | Zoltok .......................... 49/248 |
| 4,113,617 A | * | 9/1978 | Bereskin et al. ............. 210/742 |
| 4,128,833 A | * | 12/1978 | Tsavaris ...................... 340/603 |
| 4,326,952 A | * | 4/1982 | Blake ........................... 210/85 |
| 4,915,823 A | | 4/1990 | Hall |
| 5,296,150 A | * | 3/1994 | Taylor, Jr. .................... 210/708 |
| 5,499,643 A | * | 3/1996 | Vincent et al. .......... 134/104.4 |
| 5,520,825 A | * | 5/1996 | Rice ............................ 210/802 |
| 5,935,449 A | | 8/1999 | Buehler et al. |
| 5,993,646 A | * | 11/1999 | Powers ........................ 210/86 |
| 6,207,061 B1 | | 3/2001 | Pedersen et al. |
| 6,298,604 B1 | * | 10/2001 | Rogers et al. ................ 49/340 |
| 6,416,667 B1 | * | 7/2002 | Graves ........................ 210/620 |
| 6,428,692 B2 | * | 8/2002 | Happel ........................ 210/155 |

FOREIGN PATENT DOCUMENTS

JP          2001-311216 A  * 11/2001

* cited by examiner

*Primary Examiner*—Frank M. Lawrence
(74) *Attorney, Agent, or Firm*—Whitham, Curtis & Christofferson, PC

(57) ABSTRACT

A grease trap and management tank is disclosed herein. The trap has two compartments, a forward and rear compartment separated by two baffles so that grease and oils may rise and solids and sludge settle out and not be introduced into a sewer line. An ultra sonic monitoring device is also shown with local record keeping and alarm capabilities as well as remote management options through phone line, wireless or internet communications. Servicing may be scheduled according to this data to prevent any problems with the trap. The grease trap also features an access door that opens to reveal the entirety of the grease trap for easy cleaning. Since the dimensions of the tank do not exceed the width and height of standard doorways, installation indoors is greatly simplified. Along with adaptable risers, the trap may be made of metal, plastic or any other suitable material, installed indoors and mounted in concrete or any other suitable construction material.

10 Claims, 4 Drawing Sheets

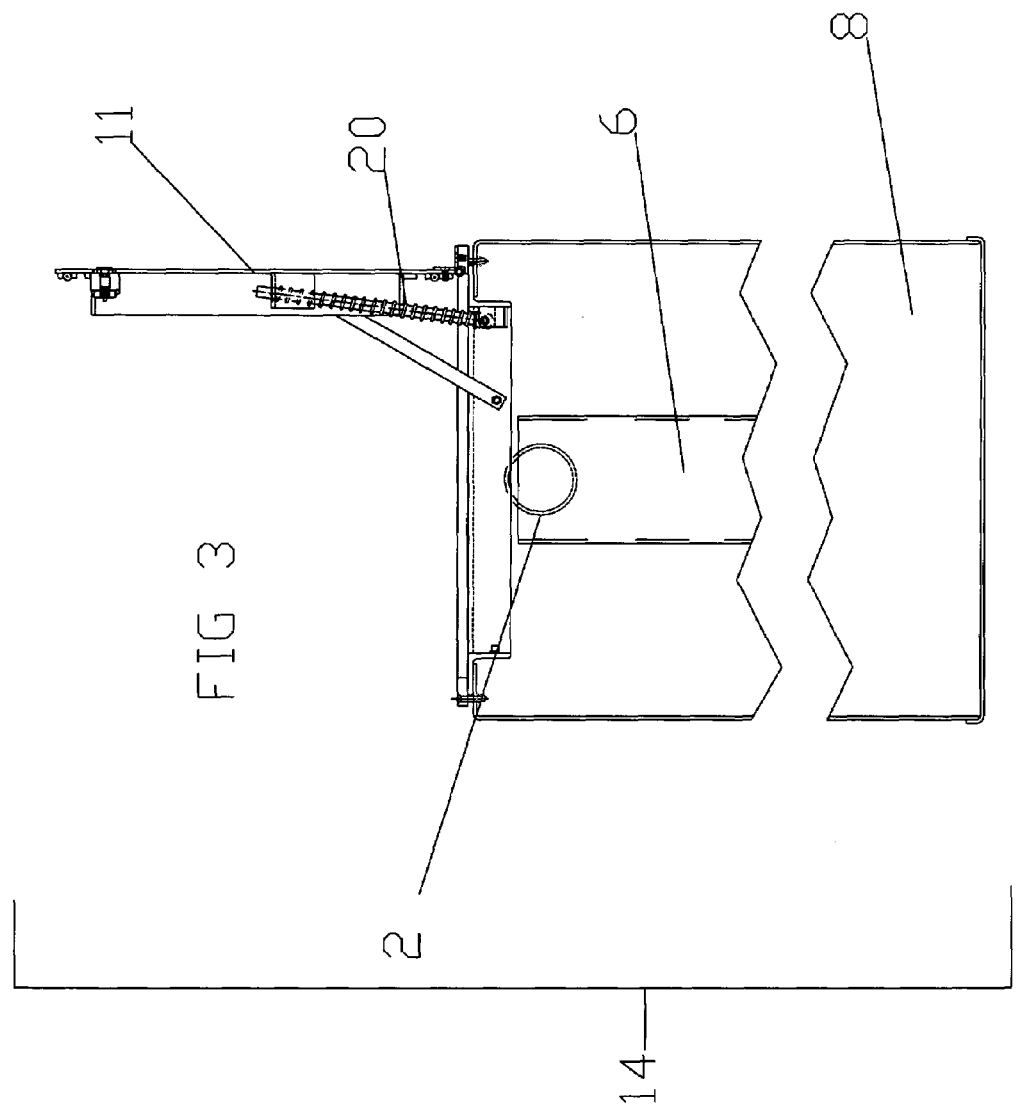

GREASE INTERCEPTOR (TRAP) AND SERVICING METHOD

This application claims priority to U.S. Provisional Application 60/406,516 filed Aug. 28, 2002.

BACKGROUND OF THE INVENTION

1. Field of the Invention

The present invention generally relates to grease traps and refuse tanks and methods of servicing grease traps and refuse tanks. More particularly, the invention offers solutions for the construction and positioning of large grease traps, as well as monitoring and servicing of large grease traps.

2. Background Description

Restaurants and other commercial venues generate large amounts of waste that is disposed of down a drain. The grease, soap and semi-solids that are then introduced into the sewer system, may generate great hardship for those maintaining a city wide infrastructure. The excess waste can damage filtration and waste processing plants, as well as clog and damage pipes in the field. Many municipalities follow the Uniform Plumbing Code and require that commercial venues use grease traps or other solutions to limit the amount of effluent that they expel into municipality sewer lines. Also, if no such solution is used, clogs may back up a sewer, producing a sanitary sewer overflow. The United States Environmental Protection Agency may then fine the city or municipality if a sanitary sewer overflow occurs.

To combat this problem, many localities regulate how much effluent and waste a restaurant or other commercial venue may dispose of through the sewer and may suspend the venue's licence or impose a heavy fine if the limit is exceeded. Commercial venues have the option to use tanks, to let effluent and waste settle out of waste water before it is communicated to the city lines. The simplest tanks are large, underground enclosures that hold several hundred gallons of water and are located outdoors. The mixed waste water and effluent is introduced at one end and clarified water exits from the other end of the tank. These intake and output pipes are sometimes protected or baffled so that only material from a certain level of the tank may enter the outgoing pipe. Since grease and effluent floats, while semi-solids and other waste sinks over time, limiting the flow of material to a middle level of the trap improves the clarity of the water that is passed on. Once grease and sludge are settled out of the water, there should be a layer of fairly clear water that may be discharged to the municipal water system without fear of exceeding regulations. Since effluent and other wastes are trapped in the tank, frequent cleaning is mandatory so that effluent, grease or semi-solids do not build up to such levels where they may block or be expelled through the outgoing pipe of the grease trap.

Cleaning the trap is a messy and time consuming job. Scheduled maintenance helps to stave off trap overflow, but may prove to be uneconomical if the trap is not full. On the other hand, if a grease trap is full and there is no maintenance scheduled for that day, the venue may have to shutdown until a service can come and dispose of the waste.

Many venues have space restrictions. Restaurants in tight city locations do not have the space for a large, underground and outdoor grease trap, so they are forced to use small in-floor or under-the-sink traps. These grease traps hold only a few dozen gallons and may need to be emptied every day. The terms interceptor and trap may refer to different configurations in different parts of the United States. For the purposes of this application, interceptor and trap are used interchangeably.

SUMMARY OF THE INVENTION

It is a object of the invention to provide for a new and improved commercial grade grease and refuse capturing tank, providing advanced monitoring, positioning and access options.

It is a further object of the invention to provide a built in level monitor for the grease trap that is able to alert the owner and maintainer of the grease trap about the various levels of materials in the tank.

It is a further object of the invention to provide an access door that is large and able to expose the entirety of the tank when used.

It is a further object of the invention to provide a new and improved grease trap that is of large size, but of suitable dimensions so as to be installed indoors.

A grease interceptor (trap) and management tank is disclosed herein. The trap has two compartments, a forward and rear compartment separated by two baffles so that grease and oils may rise and solids and sludge settle out and not be introduced into a sewer line. An ultra sonic monitoring device is also shown with local record keeping and alarm capabilities as well as remote management options through phone line, wireless or internet communications. Servicing may be scheduled according to this data to prevent any problems with the trap. The grease trap also features an access door that opens to reveal the entirety of the grease trap for easy cleaning. Since the dimensions of the tank do not exceed the width and height of standard doorways, installation indoors is greatly simplified. Along with adaptable risers, the trap may be made of metal, plastic or any other suitable material, installed indoors and mounted in concrete or any other suitable construction material.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a cross sectional view from the side of the grease trap or refuse tank according to this invention with its door open.

DETAILED DESCRIPTION OF A PREFERRED EMBODIMENT OF THE INVENTION

Figure 1:
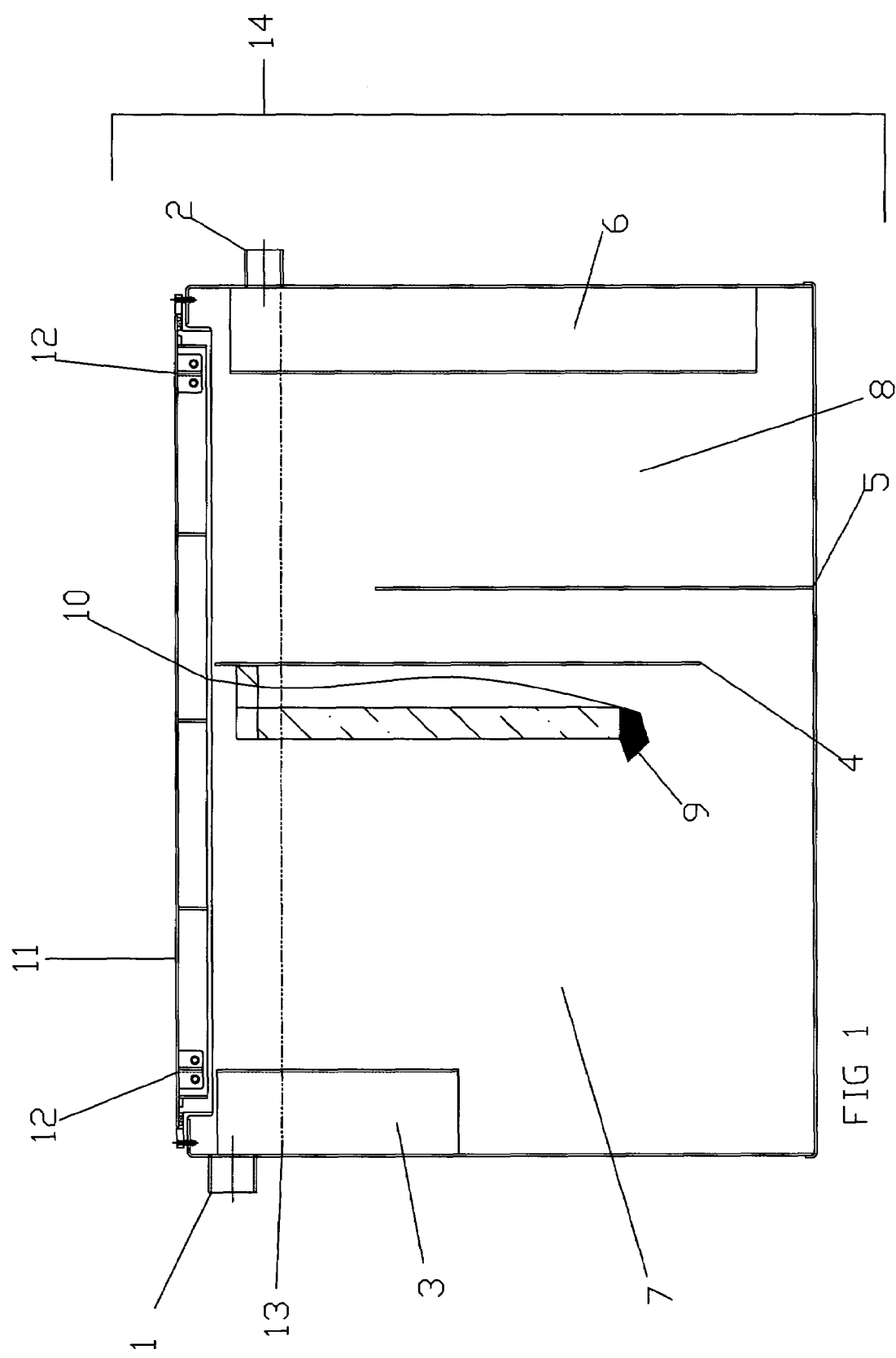
FIG. 1 is a cross sectional view of the grease trap or refuse tank according to this invention from the side.

Referring now to the drawings, and more particularly to FIG. 1, the grease trap (also referred to as a refuse tank) 14 is shown in its preferred embodiment. Water and effluent enters the grease trap 14 through intake pipe 1 and enters the first compartment 7. Material introduced to the trap 14 by pipe 1 is guided by duct 3 so the water and effluent are introduced in the middle level of the first compartment 7 of the grease trap 14. The usual level of the contents of the entire grease trap 14 is denoted by line 13. It is to this level that grease and oils will rise, while semi-solids and other wastes may fall to the bottom of the first compartment 7. In this compartment 7, most of the waste is trapped.

To assist in monitoring the levels of the waste, it is preferable that an ultrasonic monitor 9 is used. Ultrasonic monitor 9 emits high frequency sound waves both upwards and downwards. By measuring the amount of time it takes any reflected sound waves to return to the monitor 9, the heights of various levels of substances may be calculated, as it is well known in the art. Other monitors may also be used in a similar manner in the practice of this invention. Data collected by the monitor 9 may then be transmitted out of the grease trap 14 by wire 10, or by a wireless transmission, to an on site monitoring station or over phone lines, a wireless link, or the internet via phone lines or a wireless link, to a remote station, preferably located at a grease trap servicing agency. Monitor 9 can issue alerts as to the levels in the tank, either to a local monitoring station, or to a remote location. These alarms may be set locally or from a remote location, assisting in the scheduling of emptying the tank (i.e., different levels can be selected for alarm in order to allow different lead times(e.g. 1 day, 1 week, etc.) before service is required).

Baffle 4 assists in the separation of water and effluent as the water flows out of the first compartment 7. Baffle 4 is situated so that oils and grease may be trapped at the top of the first compartment 7. As water and effluent flows out of intake pipe 1 and through the first compartment 7, grease and oil will separate out, and float to the top of the tank. Baffle 4 then prevents the oil and grease from traveling any further, by blocking the communication of material to the second compartment 8 that is above a certain level in the first compartment 7. Baffle 5 limits the movement of semi-solid waste into the second compartment 8. As grease and oils are rising out of the water and effluent stream in the first compartment 7, solids and sludge may settle out and come to rest at the bottom of the tank. Baffle 5 limits how far the sludge may travel so that it may not obstruct output duct 6 in the second compartment 8.

It is preferred that ultrasonic monitor 9 be placed in the first compartment 7 of the grease trap 14 due to the greater accumulation of grease in the first compartment 7. The baffles 4 and 5 work to keep as much effluent in the first compartment 7 as possible. As the effluent separates out of the water-effluent mixture, grease and oil will gather on the surface of the contained liquid to the left of baffle 4 and sludge and semi-solids will collect on the grease trap's 14 floor to the left of baffle 5, due to the flow of the waste water from the left to the right through the grease trap 14. Build up of effluent and waste in these places poses the greatest potential problem for the grease trap 14, as accumulated waste may block the passage of water between compartments 7 and 8, or may bypass the first compartment 7 altogether. Because of this, the ultrasonic monitor 9 is preferably positioned so areas immediately to the left of baffles 4 and 5 are monitored. A second monitor may also be placed in the second compartment 8 if further monitoring needs to take place. Also, if no baffles are used, the monitoring device may simply be placed anywhere in the grease trap.

Figure 2:
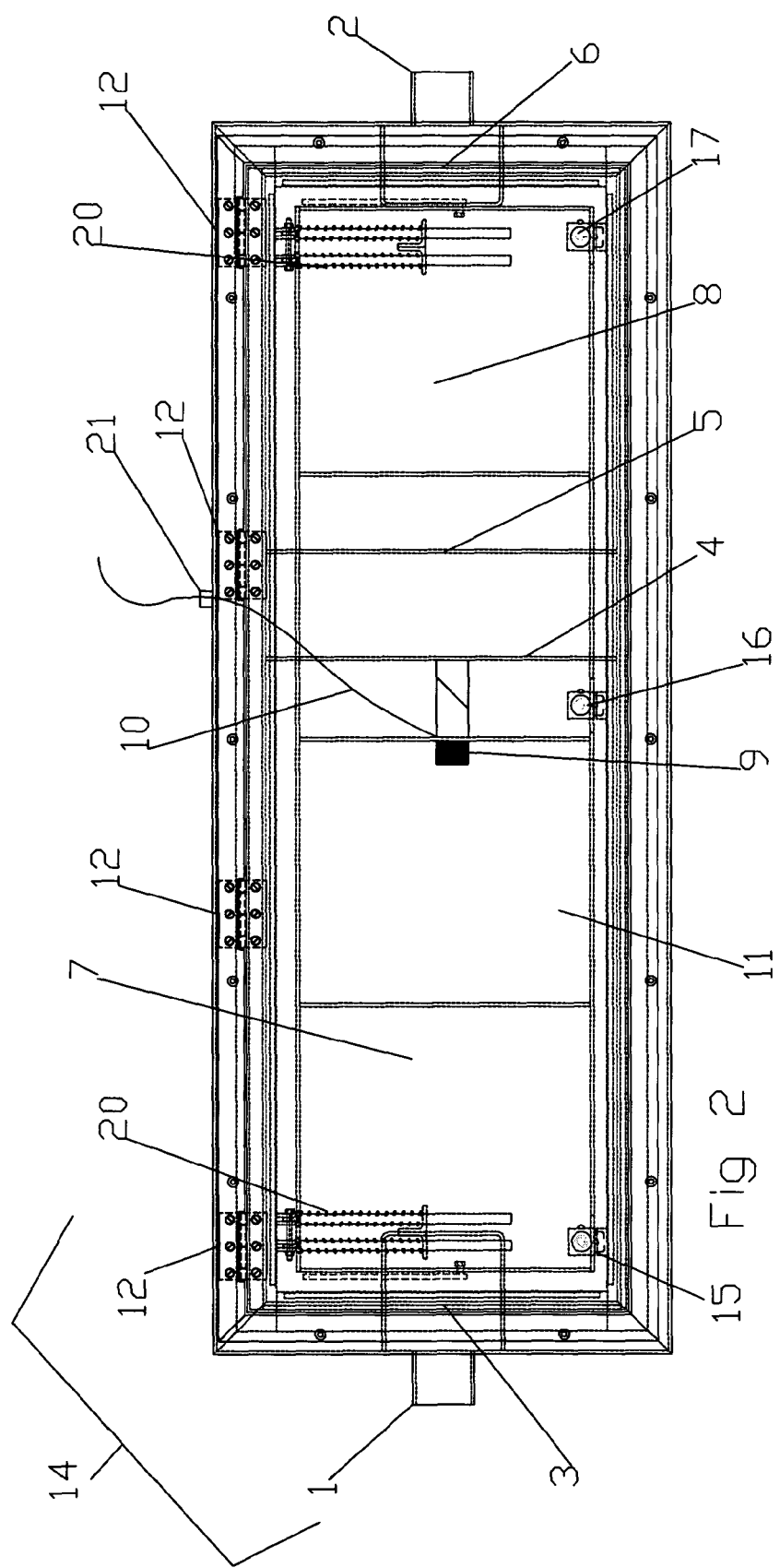
FIG. 2 is a cross sectional view of the grease trap or refuse tank according to this invention from the top.

With the assistance of monitor 9, the sludge and grease collected in the grease trap 14, may be periodically cleaned out through access door 11. Access door 11 is attached to trap 14 by hinges 12, as well as bolts 15, as shown in FIG. 2, to secure the door in a closed position. The door 11 allows access to the entirety of the tank for easy cleaning.

Once the water and effluent travels through the trap, which routinely takes 20–30 minutes, the clarified water flows out through output duct 6 and outgoing pipe 2.

The grease trap 14 may be a variety of different sizes depending upon the intended use of the system. In order to permit indoor storage of large amounts of waste, the trap 14 is preferably not more than 3 feet wide and 7 feet high. This permits the tank to fit through standard size doors but still have volumes of 1000, 750, 500, 300 or 250 gallons (e.g. no more than 1500 gallons, but larger than a trap which captures one day's grease).

Now referring to FIG. 2, the grease trap 14 is shown from a downward looking perspective with the access door 11 closed. The door 11 is fastened to the trap 14 by the bolts 15, 16, 17. Spring assemblies 20 are preferably used to assist in opening the door 11. In order for grease trap 14 to be mounted in the floor, door 11, preferably, is made of aluminum or another material to support any weight that may be placed upon door 11. Since door 11 is very sturdy, it may also be very heavy when constructed of materials such as steel, and spring assemblies 20 will be needed to assist in the opening of door 11. Outlet 21 permits ultra sonic monitoring cord 10 to exit the enclosure and continue to a local monitoring station or remote access option.

Now referring to FIG. 3, the grease trap 14 is shown with access door 11 open to allow access to the entirety of the tanks, including output duct 6 as well as second compartment 8. The top of both ducts 6 and 3 are open to facilitate cleaning when the rest of the tank is to be emptied.

Figure 4:
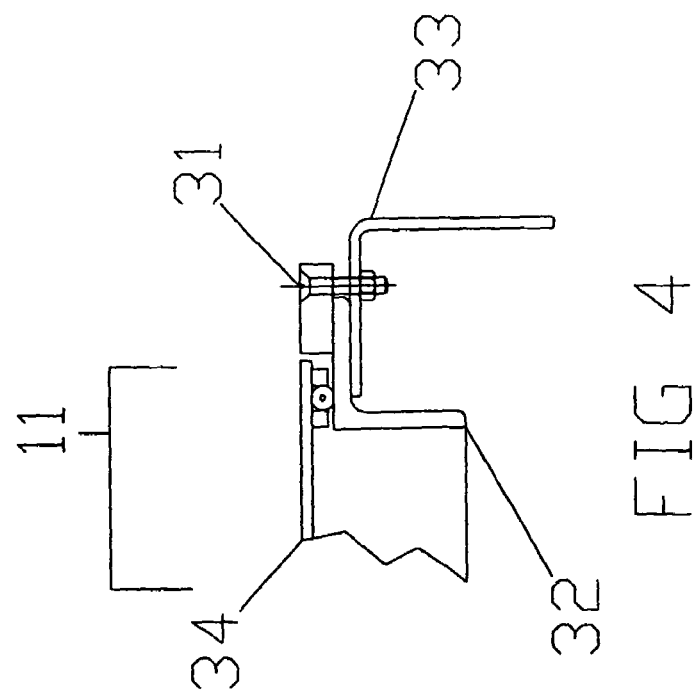
FIG. 4 shows a preferred screw assembly that fastens the door to the grease trap or refuse tank according to this invention.

In FIG. 4, the access door 11 is shown as preferably being attached to grease trap side wall 33. Bolt 31 is preferably buried, once the grease trap is fully installed so that door 11 may be flush with the floor or ground once installed. The modular nature of the door 11 makes it easy to customize the orientation of the door to every site. The door hatch 34 is attached through the aforementioned spring system 20 in FIG. 3, to door encasement 32.

Figure 5:
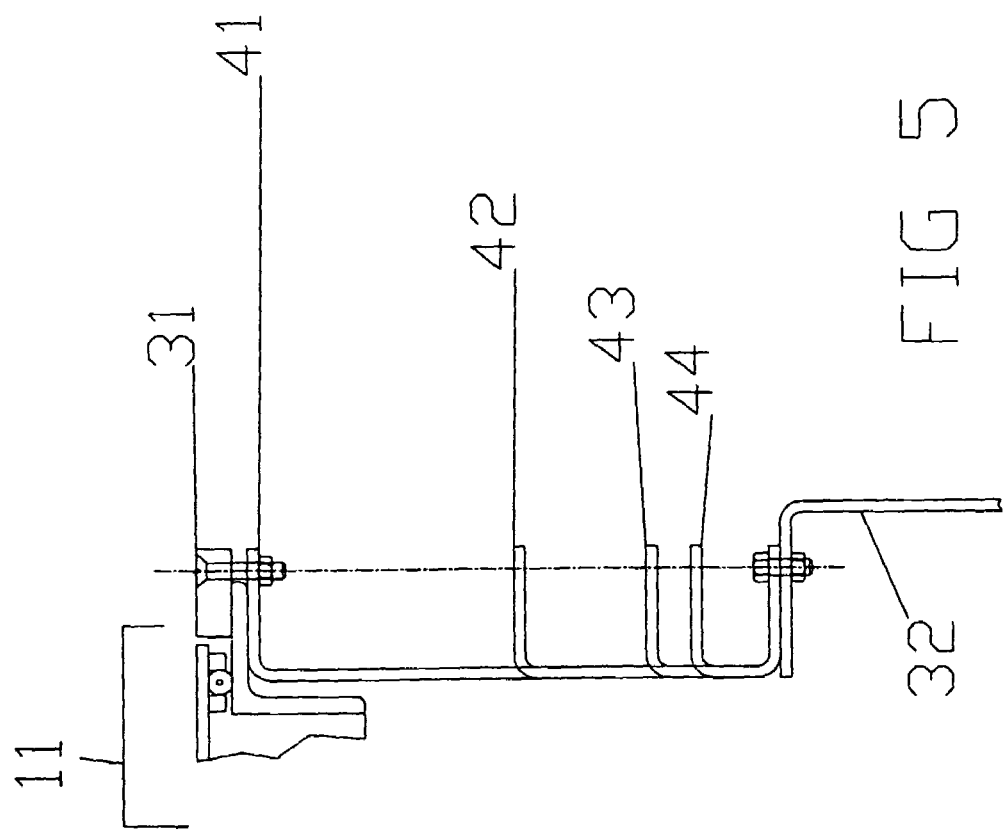
FIG. 5 shows a side view of various risers which may be used in the practice of this invention and illustrates how they may be attached to the grease trap or refuse tank according to this invention and the door.

FIG. 5 shows how various risers may be employed. Risers 41–44 are shown respectively as 12, 6, 3 and 2 inch extensions. Multiple risers may also be stacked to bring door 11 level with the floor or ground of the installed site.

While in the foregoing embodiments of the invention have been disclosed in considerable detail for the purposes of illustration, it will be understood by those skilled in the art that many of these details may be varied without departing from the spirit and scope of the invention.

Having thus described our invention, what we claim as new and desire to secure by Letters Patent is as follows:

1. A grease interceptor (trap) comprising:
   1. a collection portion which collects a volume of grease;
   2. a door affixed to said collection portion by one or more hinges, wherein said door allows access to an entirety of a tank of said grease interceptor, including two sections of said collection potion; and
   3. a baffle structure positioned in said collection portion so as to divide said collection portion into said two sections but which allows liquid to flow between said two sections and which captures grease at different levels in said two sections.

2. The grease interceptor (trap) of claim 1 further comprising a spring system to assist in the operation of said door.

3. The grease interceptor (trap) of claim 1 further comprising risers bolted between the top of said tank and said door.

4. The grease interceptor (trap) of claim 1, wherein said tank possesses a side that is not more than 7 feet by 3 feet in dimensions and not less than 250 gallons in volume.

5. A grease interceptor (trap) comprising:
   a. a collection portion which collects a volume of grease;
   b. a door affixed to said collection portion by one or more hinges; and
   c. a baffle structure so as to divide said collection portion into two sections but which allows liquid to flow between said two sections and which captures grease at different levels in said two sections; and
   d. a monitoring device located in a first of said two sections, wherein said monitoring device enables notification to empty said collection portion both locally and to a remote location through a wired or wireless link.

6. The grease interceptor (trap) of claim 5, wherein said door allows access to an entirety of said collection portion, including said two sections.

7. The grease interceptor (trap) of claim 5, further comprising a spring system to assist in the operation of said door.

8. The grease interceptor (trap) of claim 5, further comprising risers bolted between the top of said collection portion and said door.

9. The grease interceptor (trap) of claim 5, further comprising a second monitoring device located in a second of two sections.

10. The grease interceptor (trap) of claim 5, wherein said interceptor (trap) possesses a side that is not more than 7 feet by 3 feet in dimensions and not less than 250 gallons in volume.

* * * * *